Dec. 15, 1936.  W. H. FINLEY ET AL  2,064,343
PRESSURE OPERATED VALVE STRUCTURE
Filed March 7, 1934
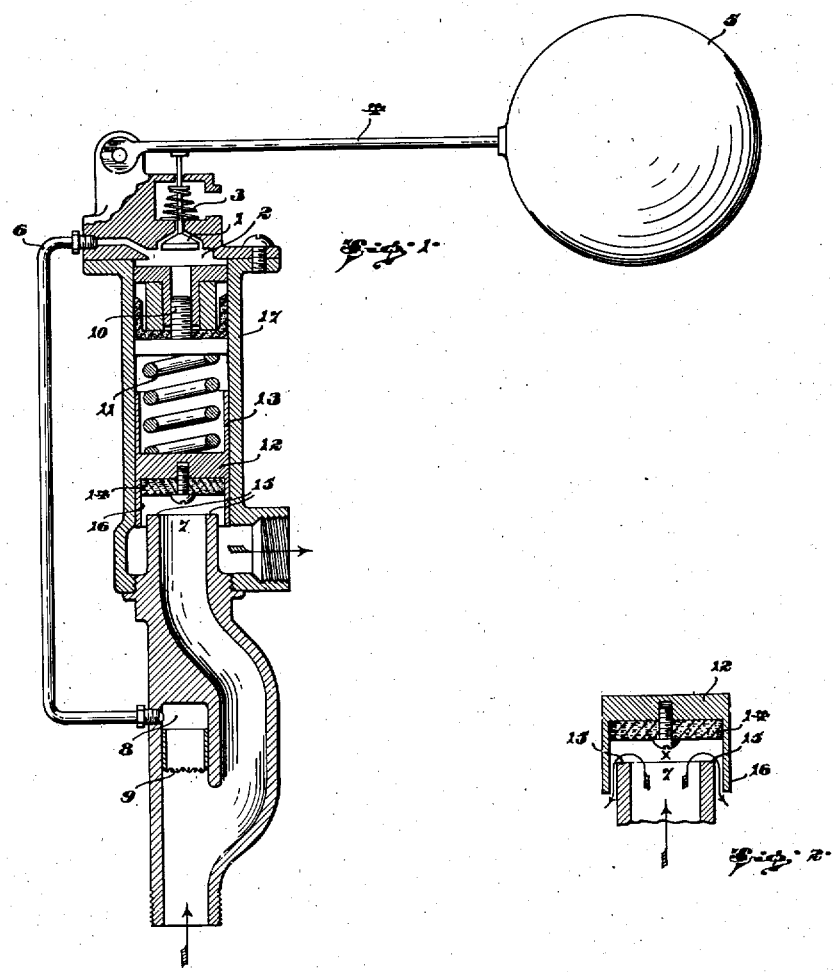
Walter H. Finley
Charles H. Hamilton
Inventors
By Edward W. Holmes
Attorney Patented Dec. 15, 1936

2,064,343

UNITED STATES PATENT OFFICE 2,064,343

PRESSURE OPERATED VALVE STRUCTURE

Walter H. Finley and Charles H. Hamilton, Nashville, Tenn., assignors to Finley & Hamilton, Inc., Nashville, Tenn., a corporation of Tennessee Application March 7, 1934, Serial No. 714,490

3 Claims. (Cl. 137—139)

This invention relates to improvements in fluid valves and particularly to a valve adapted to be operated by fluid pressure as through the medium of a plunger connected with the valve and operating in a suitable cylinder, which cylinder may be supplied with operating fluid from the same line as that which the valve opens and closes or otherwise affects. This type of apparatus is well known, and as ordinarily constructed, the plunger, if made to seal properly against the wall of the cylinder, has a tendency to seize or freeze after remaining in one position for a considerable time, preventing proper operation of the valve to an open position, as by direct action of the fluid, contained in the chamber or conduit with which the valve is associated, on the valve.

The objects of the invention include the provision of a method and apparatus for preventing seizure of the coacting surfaces of such plunger and cylinder to the end of permitting free and unrestricted operation of the valve. A further object of this invention is the provision of novel apparatus for conveying operating fluid to such cylinder and piston, particularly from the same line as that served by the main valve.

A still further object of this invention is the provision of a valve structure which is simple and capable of being manufactured at a reasonable cost. Other objects and advantages will become evident as the description proceeds.

The invention is described in the following specification, illustrated by the accompanying drawing and its salient features included in the appended claims.

In the drawing:

Fig. 1 is a vertical sectional view through the structure in one form thereof; and Fig. 2 is a similar view of the valve only, on a larger scale.

As shown, a pilot valve 1 is directly connected with the pressure chamber 2, although this valve may be located at any other point communicating with the chamber. The pilot valve may normally be closed by a spring 3 and operated by a lever 4 and float 5. The valve may be normally open or closed and operated manually, electrically or otherwise. The pressure chamber 2 is connected to a source of pressure, as by a pressure tube 6, which, as shown, comprises a comparatively long tube of constant diameter, the same being relatively small. The constant diameter small tube (1/64" inside e. g.) operates principally by friction to regulate feeding of fluid to the pressure chamber and is maintained free by the uniform rapid rate of flow throughout its length. Alternatively the effective passage may comprise any kind of channel or orifice, but it must have a discharge capacity less than that of the pilot valve and its channels. The tube 6 may also be connected with any source of pressure adequate for operation.

While the main valve 12 is discharging, the pressure in the supply line is greatly reduced and this reduction becomes more marked as the fluid approaches the port 7. For convenience, the tube 6 is connected to the supply line, as shown, quite close to the port and, to prevent undue drop in pressure while the port is open, the tube is connected into the supply line in an inertia chamber 8, which, as shown, comprises a fixed pocket which is freely open opposite the direction of flow through the supply line, being otherwise closed except for the entrance to the tube 6, shown as protected by a fine screen 9. Experience has proven the screen to be unnecessary in most installations. The inertia of the incoming fluid directly into the chamber 8 sets up a much higher pressure therein than would be the case if the channel were open directly on to the port.

The plunger 10 is a packed piston which operates in the valve body 17. It moves in one direction as a result of the force created by pressure in the chamber 2 and is moved in the other direction by the reaction of the spring or other elastic means 11 and the fluid pressure through the port 7. The valve 12 is guided in the body 17 by any suitable means, such as the encompassing tube 13, and carries a washer 14 which is forced against the valve seat 15 to close the valve by the power of the plunger 10 which is transmitted solely through the member 11. The valve 12 carries a skirt 16 which extends below the washer 14 and at all times surrounds the valve seat 15. When the valve is about to open, the total force available for opening is the static pressure at the port against the washer 14. On the actual opening of the valve, a jet is impinged against the washer continuing to exert force tending to open the valve wider. The skirt 16 reverses the direction of the run-off from this jet and this reaction greatly increases the force operating to open the valve. Without this skirt, the discharge from the jet would be radial and set up, at the center of divergence, a partial vacuum permitting the valve to again rise and again be drawn down causing a vibration which would be both destructive and noisy. (This action is fully set out in all standard works on hydraulics.) The skirt accomplishes an opening of the valve without vibration, noise or destruction. The annular opening of the skirt is at least as great as that of the valve port.

With the valve in the closed position, the pressure becomes static and equal in the supply line, the tube 6 and the chamber 2. The plunger 10 has compressed the spring 11 to the point where the reaction of the spring balances the force of the plunger, and the valve is held closed by the total of this force. In this position, if the packing of the plunger is sufficiently tight to serve its purpose, the static friction between said packing and the walls of the valve body 17 becomes excessive and much more force is needed to break this friction than can be developed by the pressure of the fluid under the washer 14 in the port 7 when the pressure in chamber 2 is relieved. The stored up power of the spring, however, in this structure is made available to break such friction seizure. The operating force, which is equal to the total force of the plunger exerted in closing, is stored up in the spring after the valve is closed. The opening of the pilot valve quickly reduces the pressure in the chamber 2 to approximately zero. Thereupon the energy stored in the spring is released and raises the plunger 10 until the stress on the spring becomes less than the fluid pressure at the port 7 against the washer 14, whereupon the valve, spring and plunger will all rise together as the valve opens. The valve will remain open until the pilot valve is closed and pressure is again built up in the chamber 2 by the relatively slow feeding action of the tube 6. Once the pilot valve is opened, the main valve opening operation follows automatically, the period of operation being determined by the length and/or bore of the tube 6. This period may also be determined by the travel or displacement of the piston.

The action of the spring 11 in breaking the static friction of the packing is only a part of its function. While the valve is standing closed, the fluid pressure is theoretically static but practically it is constantly fluctuating. The drawing on the line in the premises or neighborhood causes a constant change in this pressure and, therefore, the plunger, which is riding on the spring, will constantly rise and fall, in varying degrees, as the pressure varies and thus insure the prevention of excessive sticking of the packing and the plunger, although there is ample force in reserve to break the adhesion without difficulty.

While the preferred form of this invention has been described and illustrated, it is to be understood that various structural changes may be made which fall within the spirit of the invention and the scope of the appended claims.

What we claim is:

1. In a pressure operated valve structure, a pressure chamber, a pilot valve arranged to release pressure in said chamber, a fluid conduit, means forming a relatively narrow passage which affords communication between said fluid conduit and the chamber, said chamber including a cylinder and a plunger sealingly engaging the cylinder and adapted to be actuated in one direction by the fluid admitted to the chamber through said passage, a valve controlling the fluid in the conduit, and a spring operatively connecting the plunger and said latter valve, whereby upon release of pressure in the pressure chamber the recoil of the spring will break the adhesion between the plunger and the cylinder.

2. In a valve apparatus, means adapted to contain fluid under pressure, said means having a fluid discharge valve including a discharge port and a plug for closing the port, the plug and port being so arranged that pressure in the first-named means may move the plug to open the port, means forming a pressure chamber and means adapted and arranged to quickly release pressure therein, the pressure-chamber-forming means including a cylinder and a plunger slidable therein and operatively connected to the valve plug to close the valve when the plunger moves in one direction in its cylinder, means to supply fluid under pressure to the chamber, at a relatively slow rate, said latter means acting in cooperation with the plunger with greater effective force tending to close the valve than is exerted by said fluid under pressure in the first-named means tending to open the valve, so that the valve is normally maintained closed, the operating connection between the plunger and valve comprising resilient energy-storing means, whereby, upon quick release of the pressure in the chamber the released energy will cause the plunger to move in the opposite direction in its cylinder irrespective of static friction between the coacting plunger and cylinder surfaces tending to cause the plunger to resist movement.

3. In a valve apparatus, comprising a valve adapted and arranged to close a fluid exit for fluid under pressure, said valve including a part movable to fluid releasing position, a pressure chamber and means slidable therein and yieldingly operatively connected with said valve part in a manner to cause it to close such exit, and to subsequently move relative to said valve part without affecting the operation of said part, and means including a passage communicating with said chamber to admit operating fluid under pressure to the chamber to actuate the slidable means, a pilot valve operatively associated with the pressure chamber and adapted for operation to release pressure in the chamber, said pilot valve having greater fluid discharge capacity than said passage.

WALTER H. FINLEY.
CHARLES H. HAMILTON.

DISCLAIMER 2,064,343.—*Walter H. Finley* and *Charles H. Hamilton*, Nashville, Tenn. PRESSURE OPERATED VALVE STRUCTURE. Patent dated December 15, 1936. Disclaimer filed March 14, 1938, by the patentees; the assignee, *Finley & Hamilton, Inc.*, affirming, concurring, and consenting.

Hereby disclaim the invention described and defined by each of the three claims of the patent except as to constructions in which the valve, called for by each of the claims, closes in a direction which is opposite the direction of flow through the valve port of fluid controlled by the valve. In other words, claims 1, 2, and 3 of the patent are hereby limited to said specific type of valve, in the class of hydrostatically controlled valves.

[*Official Gazette April 12, 1938.*]

of the skirt is at least as great as that of the valve port.

With the valve in the closed position, the pressure becomes static and equal in the supply line, the tube 6 and the chamber 2. The plunger 10 has compressed the spring 11 to the point where the reaction of the spring balances the force of the plunger, and the valve is held closed by the total of this force. In this position, if the packing of the plunger is sufficiently tight to serve its purpose, the static friction between said packing and the walls of the valve body 17 becomes excessive and much more force is needed to break this friction than can be developed by the pressure of the fluid under the washer 14 in the port 7 when the pressure in chamber 2 is relieved. The stored up power of the spring, however, in this structure is made available to break such friction seizure. The operating force, which is equal to the total force of the plunger exerted in closing, is stored up in the spring after the valve is closed. The opening of the pilot valve quickly reduces the pressure in the chamber 2 to approximately zero. Thereupon the energy stored in the spring is released and raises the plunger 10 until the stress on the spring becomes less than the fluid pressure at the port 7 against the washer 14, whereupon the valve, spring and plunger will all rise together as the valve opens. The valve will remain open until the pilot valve is closed and pressure is again built up in the chamber 2 by the relatively slow feeding action of the tube 6. Once the pilot valve is opened, the main valve opening operation follows automatically, the period of operation being determined by the length and/or bore of the tube 6. This period may also be determined by the travel or displacement of the piston.

The action of the spring 11 in breaking the static friction of the packing is only a part of its function. While the valve is standing closed, the fluid pressure is theoretically static but practically it is constantly fluctuating. The drawing on the line in the premises or neighborhood causes a constant change in this pressure and, therefore, the plunger, which is riding on the spring, will constantly rise and fall, in varying degrees, as the pressure varies and thus insure the prevention of excessive sticking of the packing and the plunger, although there is ample force in reserve to break the adhesion without difficulty.

While the preferred form of this invention has been described and illustrated, it is to be understood that various structural changes may be made which fall within the spirit of the invention and the scope of the appended claims.

What we claim is:

1. In a pressure operated valve structure, a pressure chamber, a pilot valve arranged to release pressure in said chamber, a fluid conduit, means forming a relatively narrow passage which affords communication between said fluid conduit and the chamber, said chamber including a cylinder and a plunger sealingly engaging the cylinder and adapted to be actuated in one direction by the fluid admitted to the chamber through said passage, a valve controlling the fluid in the conduit, and a spring operatively connecting the plunger and said latter valve, whereby upon release of pressure in the pressure chamber the recoil of the spring will break the adhesion between the plunger and the cylinder.

2. In a valve apparatus, means adapted to contain fluid under pressure, said means having a fluid discharge valve including a discharge port and a plug for closing the port, the plug and port being so arranged that pressure in the first-named means may move the plug to open the port, means forming a pressure chamber and means adapted and arranged to quickly release pressure therein, the pressure-chamber-forming means including a cylinder and a plunger slidable therein and operatively connected to the valve plug to close the valve when the plunger moves in one direction in its cylinder, means to supply fluid under pressure to the chamber, at a relatively slow rate, said latter means acting in cooperation with the plunger with greater effective force tending to close the valve than is exerted by said fluid under pressure in the first-named means tending to open the valve, so that the valve is normally maintained closed, the operating connection between the plunger and valve comprising resilient energy-storing means, whereby, upon quick release of the pressure in the chamber the released energy will cause the plunger to move in the opposite direction in its cylinder irrespective of static friction between the coacting plunger and cylinder surfaces tending to cause the plunger to resist movement.

3. In a valve apparatus, comprising a valve adapted and arranged to close a fluid exit for fluid under pressure, said valve including a part movable to fluid releasing position, a pressure chamber and means slidable therein and yieldingly operatively connected with said valve part in a manner to cause it to close such exit, and to subsequently move relative to said valve part without affecting the operation of said part, and means including a passage communicating with said chamber to admit operating fluid under pressure to the chamber to actuate the slidable means, a pilot valve operatively associated with the pressure chamber and adapted for operation to release pressure in the chamber, said pilot valve having greater fluid discharge capacity than said passage.

WALTER H. FINLEY.
CHARLES H. HAMILTON.

DISCLAIMER 2,064,343.—*Walter H. Finley* and *Charles H. Hamilton*, Nashville, Tenn. PRESSURE OPERATED VALVE STRUCTURE. Patent dated December 15, 1936. Disclaimer filed March 14, 1938, by the patentees; the assignee, *Finley & Hamilton, Inc.*, affirming, concurring, and consenting.

Hereby disclaim the invention described and defined by each of the three claims of the patent except as to constructions in which the valve, called for by each of the claims, closes in a direction which is opposite the direction of flow through the valve port of fluid controlled by the valve. In other words, claims 1, 2, and 3 of the patent are hereby limited to said specific type of valve, in the class of hydrostatically controlled valves.

[*Official Gazette April 12, 1938.*]

DISCLAIMER 2,064,343.—*Walter H. Finley* and *Charles H. Hamilton*, Nashville, Tenn. PRESSURE OPERATED VALVE STRUCTURE. Patent dated December 15, 1936. Disclaimer filed March 14, 1938, by the patentees; the assignee, *Finley & Hamilton, Inc.*, affirming, concurring, and consenting.

Hereby disclaim the invention described and defined by each of the three claims of the patent except as to constructions in which the valve, called for by each of the claims, closes in a direction which is opposite the direction of flow through the valve port of fluid controlled by the valve. In other words, claims 1, 2, and 3 of the patent are hereby limited to said specific type of valve, in the class of hydrostatically controlled valves.

[*Official Gazette April 12, 1938.*]